United States Patent [19]
Zanoni

[11] 3,856,411
[45] Dec. 24, 1974

[54] OPTICAL NONCONTACTING DIAMETER GAUGE

[75] Inventor: Carl A. Zanoni, Middletown, Conn.

[73] Assignee: Zygo Corporation, Middlefield, Conn.

[22] Filed: Aug. 14, 1973

[21] Appl. No.: 388,267

Related U.S. Application Data

[63] Continuation-in-part of Ser. No. 368,441, June 8, 1973, abandoned.

[52] U.S. Cl.................. 356/167, 356/160, 250/560
[51] Int. Cl. .......................................... G01b 11/00
[58] Field of Search ........... 356/156, 159, 160, 167, 356/169; 250/559, 560, 563

[56] References Cited
UNITED STATES PATENTS

| | | | |
|---|---|---|---|
| 3,744,915 | 7/1973 | Sick .................................... | 356/160 |
| 3,765,774 | 10/1973 | Petrohilos....................... | 356/159 X |

Primary Examiner—Ronald L. Wibert
Assistant Examiner—Paul K. Godwin
Attorney, Agent, or Firm—Milton Zucker

[57] ABSTRACT

An electrooptical sensor is described for providing an output proportional to the cross section of an object, i.e., the diameter of a cylinder. A beam of laser light from a rapidly oscillating mirror is scanned across the test object. By photo-electrically sensing when the laser beam is modulated on or off by the edge of the object, using the first and second derivatives of the output of the sensor to accurately determine the point of passage, the diameter of the test object can be measured, using an auxiliary photoelectric output obtained by passing a part of the scanning laser beam onto a sensor over a precision grating or scale with markings which generate a modulated signal whose spatial frequency is independent of variations in the speed of scanning and intensity of the laser beam, and then breaking up the signal with a vernier which is phase-locked to the signal from the sensor. The markings are preferably as small as possible, i.e., about half the width of the laser beam.

5 Claims, 4 Drawing Figures

3,856,411

OPTICAL NONCONTACTING DIAMETER GAUGE

RELATED APPLICATION

This application is a continuation-in-part of my application Ser. No. 368441 filed June 8, 1973 now abandoned.

BACKGROUND OF THE INVENTION

1. Field of the Invention

The present invention relates to apparatus for the accurate measurement of the cross section of an opaque object, such as the diameter of a cylinder. More particularly, the invention relates to noncontacting electrooptical apparatus for this type of measurement which is capable of rapidly and accurately measuring such diameters when the object is moving.

2. The Prior Art

For the accurate measurement of the diameter of soft, delicate, hot, or moving objects, noncontacting sensors must be used. Prior-art devices of this character include capacitive gauges, eddy-current gauges, air gauges, and optical sensors. The nonoptical sensors cannot work at distances of more than a small fraction of an inch without loss of sensitivity.

Optical sensors have advantages due to the nature of light itself. The principal advantages are:

1. They do not require direct mechanical contact between the sensor and the object to be measured;
2. The distance from the sensor to the object to be measured can be large;
3. The response time is limited to that of the photodetector and its electronics; and
4. Light variations are directly convertible to electrical signals.

Prior-art optical sensors employ various techniques, such as shadow projection, diffraction phenomena and scanning light beams.

Devices using scanning light beams move the beam past the object, and record the point at which the object cuts off the light beam, and the point at which the beam no longer is obstructed. The problem is to determine the exact point at which the light is cut off and again appears. A typical laser beam is 1 mm. wide (0.04 inch) and it is necessary to pinpoint when the center of this beam passes by the edges of the object.

One approach has been the use of a constant speed for the beam of light; this requires complete rotary motion through 360°, using an expensive constant-speed device. The angular speed must be extremely uniform, especially for large measurement apertures. Since the device measures only during the time when the light passes the object (once every rotation), only a small fraction of the actual time available is used in measuring. Thus, to get a measurement every 1/10 second, a speed of 600 revolutions per minute is required. Moreover, to get the necessary geometrical relationship between the angularly-scanned light beam and the linearly-scanned sample beam, it is necessary to use a tangent-corrected lens, which is very expensive. The accuracy of such devices leaves something to be desired; one such product on the market claims an accuracy of 0.1% or 0.0005 inch (0.5 mil), whichever is larger, which is not good enough for many uses.

A second approach eliminates the need for uniform angular-scan rates by measuring the angular-scan portion with some sort of incremental angular encoder such as a pulse generator. This requires the use of very expensive tangent-corrected optics to compensate for the lack of constant speed. In addition, resolution is poorer than in the constant-speed device. One device of this type is reported in the literature as having an accuracy of 0.0015 inch at 30 scans per second.

While these prior-art optical noncontacting gauges are useful for many measurements, they cannot be used for accurate control of many industrial operations. For example, in the high-speed extrusion of aluminum rod, it is desirable to get readings every 10 milliseconds or faster, with accuracies within 0.0005 inch (0.5 mil) or less, even for rods over 0.5 inch in diameter. The extruded rod moves in every direction as it comes out of the die, so that the gauge must be capable of these fast, accurate measurements on a test object which is not at rest.

OBJECTS OF THIS INVENTION

This invention aims to provide an electrooptical noncontacting measuring device which has high resolution and linearity, which performs measurements rapidly, uses only simple collimating lenses and simple harmonic or rotating scanners so that it is relatively inexpensive to build, and is capable of such measurements as those necessary for the high-speed extrusion of aluminum rod.

STATEMENT OF THE INVENTION

In accordance with the instant invention, I provide (1) a source of radiant energy, most preferably light from a laser, to produce a narrow beam of light; (2) means for scanning this beam of light in a direction perpendicular to its direction of propagation; (3) means for collecting and splitting said scanned beam of light onto (4A) a first photodetector through a precision scale with alternate transparent and opaque bands at least about half the width of the diameter of said scanned beam, which produce a sinusoidal signal whose spatial frequency corresponds to the spacings on the precision scale, which spacings preferably correspond to between half the diameter and the diameter of the narrow beam of light, and thence onto means for breaking up said signal from said first photodetector to produce a much higher frequency, locked in phase to the output of said signal-producing means, and (4B) past an opaque test object onto a second photodetector for photoelectrically detecting the modulation of the scanned light beam by said test object; and (5) means connected to the signals from (4A) and (4B) for measuring the position of the scanned light beam in the space of said test object. An accurate measurement of the precise points at which the light beam passes the edges of the test object is obtained by defining the edges as the points at which the first derivative of the energy from the second photodetector is above a fixed value, and the second derivative passes through zero.

THE DRAWINGS

a. the output of the second photodetector (22) as the beam passes first behind and then out from behind the test object;
b. the first derivative of 3(a);
c. the second derivative of 3(a).

Figure 4:
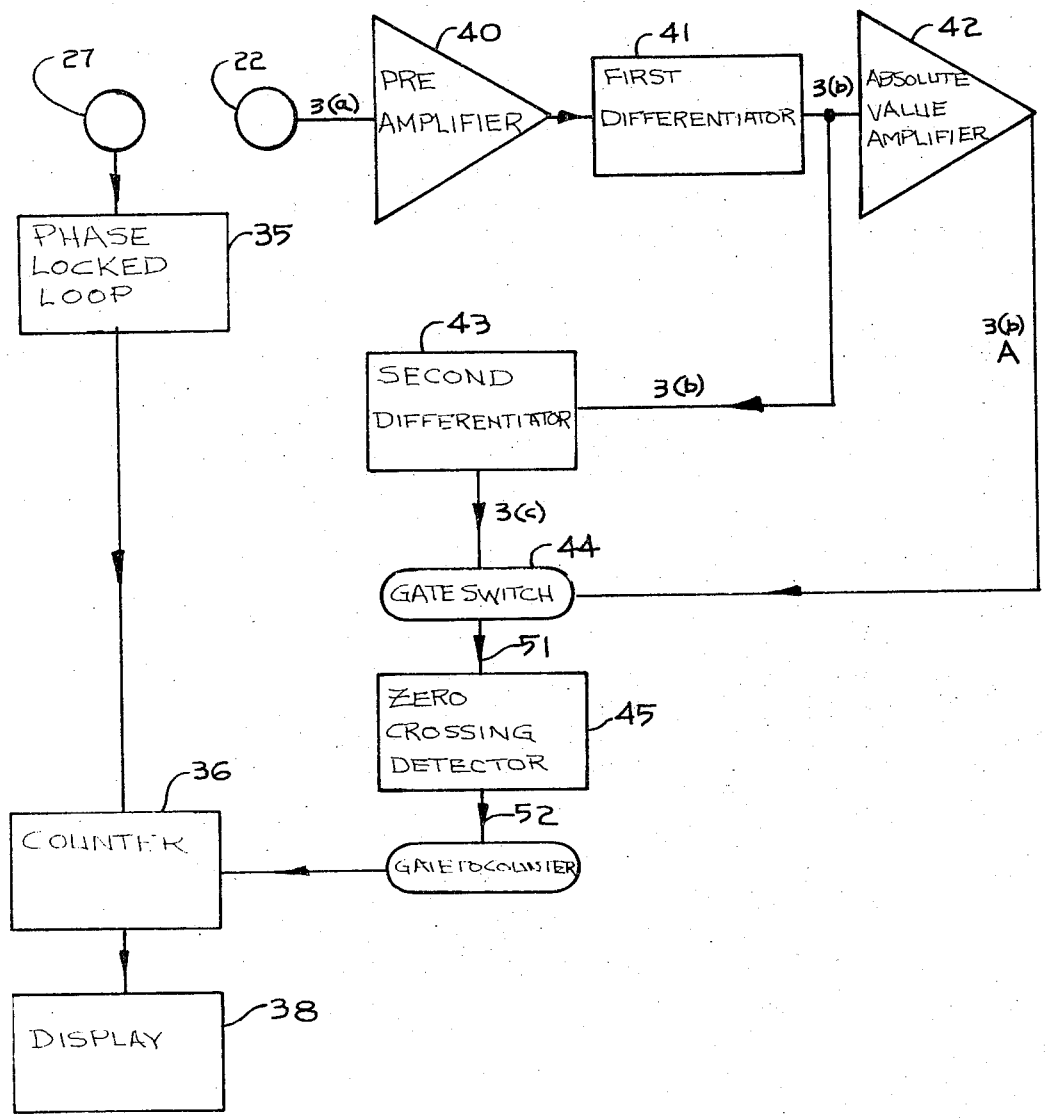

FIG. 4 is a schematic detail of the circuits from the photodetectors.

DETAILED DESCRIPTION OF THE INVENTION

Figure 1:
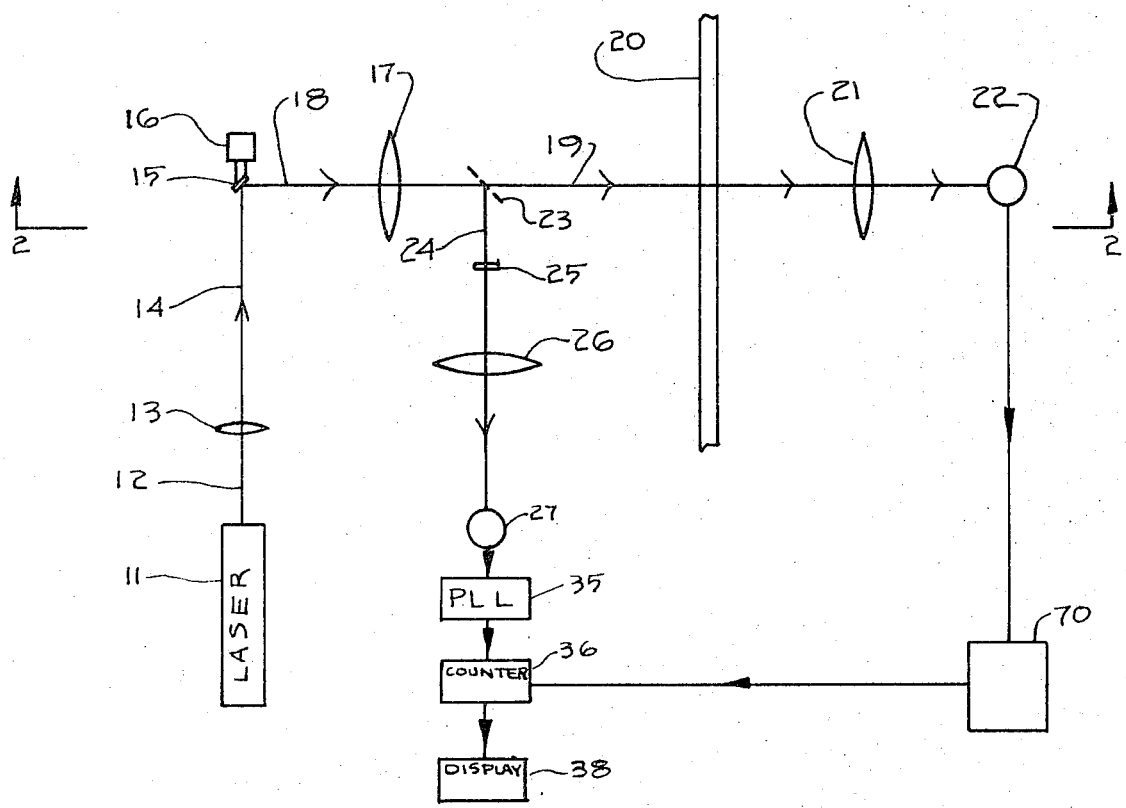
FIG. 1 is a schematic diagram of the electrooptical system of the invention.
Figure 2:
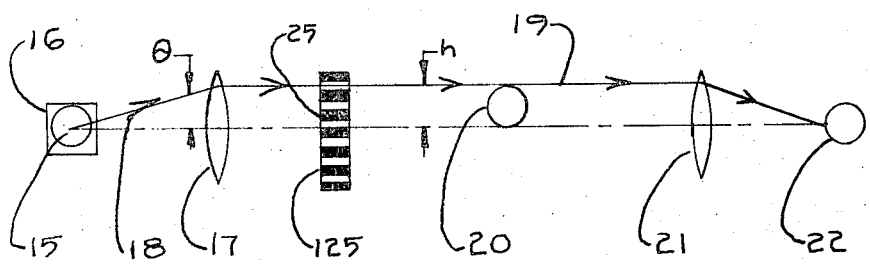
FIG. 2 is a partial view of the electrooptical system on line 2—2 of FIG. 1.

Description and Explanation of the Schematic in FIGS. 1 and 2

While the apparatus has application for a wide range of radiation sources, the following description is taken by way of example with respect to an optical measuring system. The term "radiant energy" as used herein includes, but is not limited to, electromagnetic energy of all frequency ranges.

A light source such as a tungsten bulb, xenon bulb, light-emitting diode, laser diode, or other source of radiant energy, and most preferably a gas laser 11, provides optical energy for the narrow, nearly collimated beam 12 in FIG. 1. A lens 13 is used to focus the laser beam so as to provide a beam 14 of uniformly narrow diameter in the measurement region. The light beam 14 is then reflected by a scan mirror 15. This mirror 15 is harmonically scanned by an electromechanical transducer 16 such as a galvanometric-type motor. The locus of the reflection 18 of the beam 14 on the mirror 15 is made coincident with the on-axis focal point of a lens 17. Thus the angularly-scanned light beam 18 is converted to a rectilinearly scanned beam 19 by the lens 17. The light beam 19 scans the measurement region. The linear size of the scan is essentially limited by the aperture diameter of the lens 17. A test object, bar, or other opaque object, e.g., in FIG. 1 the bar 20, placed in the measurement region will obstruct the transmission of the light beam 19 to the lens 21 for that portion of the scan which corresponds to the diameter of the bar. When the beam 19 is unobstructed by the object under measurement, the lens 21 focuses the light onto the photodetector 22 (hereinbefore described as the second photodetector). Thus the transitions from light to no-light and no-light to light on the photodetector 22 provide signals which correspond to the passage of the beam 19 past both edges of the object 20 under measurement.

A partially transmitting mirror, or beam splitter 23, directs a beam 24 which is similar to the beam 19 onto a scale 25. As shown in FIG. 2, the scale 25 is typically a polished glass plate onto which a precision periodic pattern or grating is attached. For example, the scale 25 can be a polished glass plate onto which a metallic pattern has been deposited to obtain a grating of alternatively opaque and transmissive bands 125. The width and spacing of the bands 125 are of equal size. The width of the bands is preferably between about half the diameter of the beams 19 and 24 and about the diameter. The light transmitted by the scale 25 is collected by a lens 26 and focused onto a photodetector 27 heretofore described as the first photodetector. The scale 25 provides a fundamental dimensional reference in the measurement space. The output signal of the photodetector 27 is approximately a sinusoidal wave form with fixed spatial frequency but variable temporal frequency. The bands 125 on the scale 25 may be varied slightly from precise equality to get nominally a fixed temporal frequency instead of a fixed spatial frequency.

The output signal of the first photodetector 27 has a temporal frequency $f$ related to the frequency $\omega_o$ of harmonic oscillation of the mirror 15, the amplitude of oscillation of the light beam $\theta_o$ 18, the focal length of the lens F 17, the width of a band $d$ 125 on the scale 25, and the scan angle $\theta$ of the light beam 18 measured relative to the optical axis of the lens 17. This frequency is represented by the equation $$f = (F \cdot \theta_o \cdot \omega_o / 2d) [1-(\theta/\theta_o)^2]^{1/2} \sec^2 \theta.$$

For a uniformly-rotating scan mirror, the frequency is given by $$f = (F \cdot \dot{\theta}/d) \sec^2 \theta$$

where $\dot{\theta}$ is the angular speed of the mirror.

The width of the bands 125 on the scale 25 is preferably as fine as possible, consonant with getting a satisfactory wave form from the output of the first photodetector 27. I have found that signal noise due to dust particles begins to present a significant difficulty if the width of the bands 125 is below about half the width of the laser beam, so that this is the lower limit for size. While the bands 125 can be substantially wider than the beam 24, this introduces some complexity into the wave form of the signal from the photodetector 27 and increases the problem of getting high resolution from a signal which corresponds to a beam diameter which is most conveniently about 0.04 inch (1 mm.). For this reason, I prefer to have the bands 125 approximately one-half the width to equal in width to the diameter of the laser beam, since this produces a regular signal into which a vernier effect can be introduced most simply, to obtain the desired high resolution.

The use of spacings 125 as small as half the width of the laser beam, despite the dust problem, is facilitated by using only that portion of the energy which corresponds to the opaque bands of the scale, since this portion of the energy is less affected by noise problems due to dust.

This vernier effect can be obtained in a variety of ways - for example by the use of a high-frequency clock. Most preferably, I get the desired vernier effect using a phase-locked loop 35. A phase-locked loop PLL is a feedback system comprised of a phase comparator, a low-pass filter and an error amplifier in the forward signal path and a voltage-controlled oscillator in the feedback path. Frequency multiplication can be achieved with the PLL in two ways:

a. locking to a harmonic of the input signal, or
b. insertion of a counter (digital frequency divider) in the loop.

The purpose of the PLL is to provide a signal whose frequency is much higher than the output of the first photodetector 27. In addition, the higher frequency signal is phase-locked to the output of the first photodetector 27. Such devices are available commercially from a number of electronics manufacturers.

Thus, use of the PLL to generate a phase-locked signal at, say, 100 to 500 times the frequency of that generated by the scale 25 not only provides the necessary vernier for high-precision measurements but it also eliminates the need for a fixed temporal frequency for the output of the first photodetector 27. Essentially, the PLL provides a vernier which divides each line pair on the scale 25 into much finer divisions. Furthermore, the PLL adjusts the vernier to accommodate any temporal frequency variations at the first photodetector 27 which can arise from variable angular-scan speeds of the mirror 15 and from the use of an ordinary non-tangent-corrected lens 17.

The output frequency of the PLL is used as the input to a conventional digital counter 36 which is gated on/off by the on/off signals derived from the second photodetector 22 through the black box 70 detailed in FIG. 4. The total number of counts accumulated between the light-off to light-on states of the second photodetector 22 is directly related to the diameter of the test object 20 along the direction of scan of the light beam 19. The diameter of the object can be indicated — e.g., on a digital display 38. The units of measurement can be varied by a suitable selection of the width of the bands 125 or by the use of a suitable scale factor.

For applications where it is not necessary to take measurements at a high rate of speed, a uniformly rotating mirror can be used instead of the harmonically oscillating mirror 15. Because the rotation must be of uniform speed only over the very small angle corresponding to one band of the scale 25, a highly accurate and expensive constant-speed device is not necessary. This modification has the same high resolution and accuracy as the preferred form of my invention, but cannot conveniently produce more than about 25 measurements per second.

Figure 3:
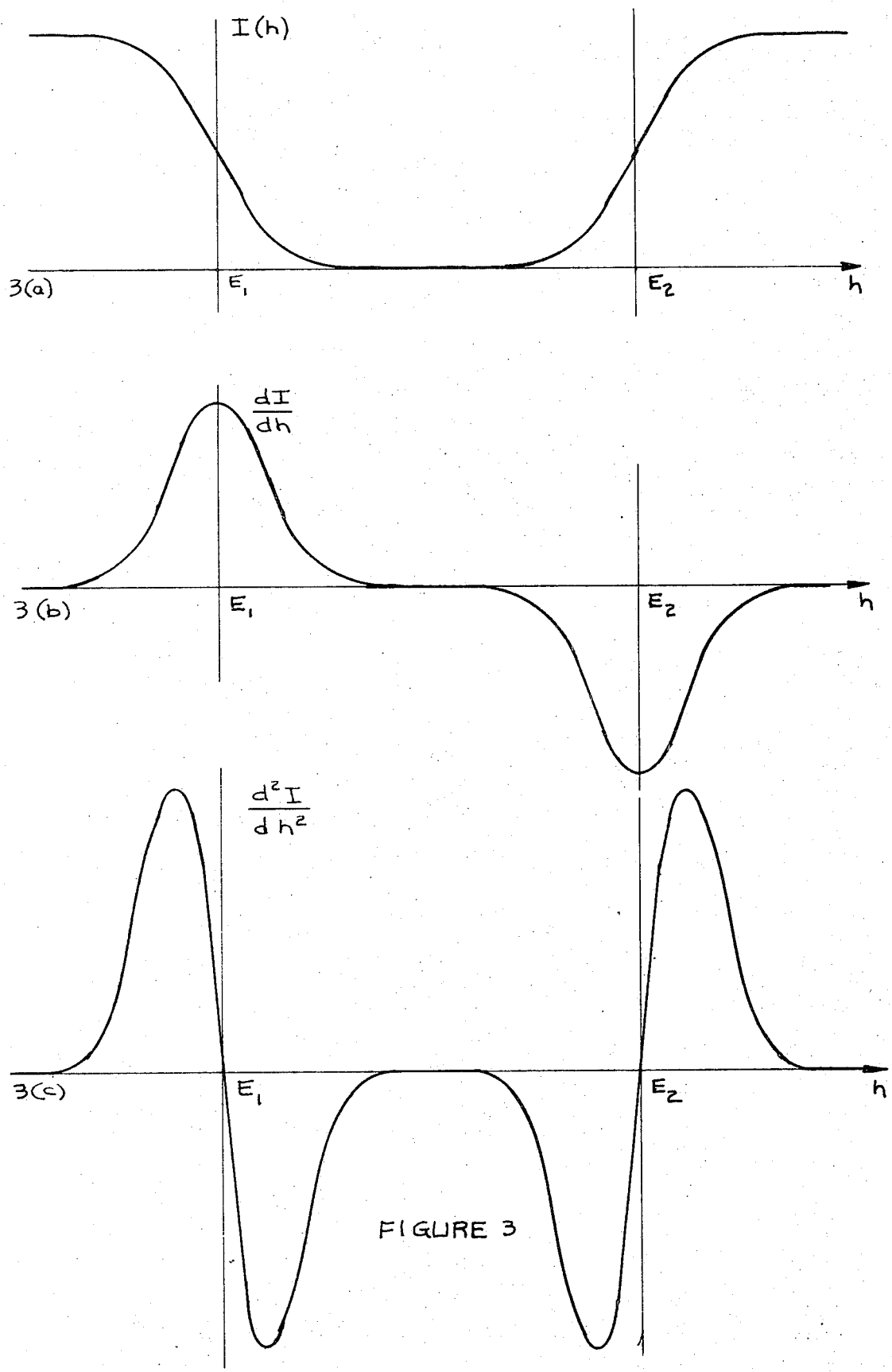
FIG. 3 is a set of curves showing.

Detailed Description of FIGS. 3 and 4

FIGS. 3 and 4 disclose the means employed to precisely locate the edges of the test object 20 by means of the output of the second photodetector 22.

Referring to FIG. 3, 3a shows the output of the second photodetector 22 as the beam 19 passes across the test object 20 measuring the intensity I of the light beam against the distance $h$. Since the beam 19 is about 1 mm. wide, the beam will pass from maximum intensity to 0 over the width of the beam; the edges of the object are at exactly the inflection points (E 1 and E 2) of curve 3(a). As the photodetectors measure light intensity, it is necessary to determine the points E 1 and E 2 on the curve 3(a) with maximum certainty, if good resolution is to be obtained.

I determine these points (E 1 and E 2) most precisely by means of the techniques illustrated in FIGS. 3 and 4. If curve 3(a) is differentiated (and this can be done with conventional electronic circuitry), we get curve 3(b). The output signal in curve 3(b) is at a maximum at the points E 1 and E 2 on curve 3(a), since the rates of change are greatest at these points. A further differentiation, to produce the second derivative of the output of the second photodetector 22, gives the curve shown in FIG. 3(c). Here, the curve passes through zero at the points corresponding to E 1 and E 2. It should be noted that the first derivative is negative during the period during which the light beam emerges from behind the test object, but is still at a maximum at the point E 2.

By using the outputs of first and second electronic differentiators, I am able to precisely pinpoint the edges of the test object 20, as shown in FIG. 4, which is a detail of the black box 70 of FIG. 1.

The output signal from the second photodetector 22, curve 3(a), is amplified in a preamplifier 40 and passed into a first differentiator 41 to produce a first derivative signal 3b. This signal is split; part of it goes to a second differentiator 43 to produce a second derivative signal 3(c). A portion of the signal from the first differentiator 41 goes to an absolute-value amplifier 42.

This amplifier 42 is designed to flip the signal 3(b) during the time the beam 19 is emerging from behind the test object. At this point, the first derivative signal 3(b) is opposite in sign to the curve shown in 3(b) and lies below the horizontal axis; the amplifier 42 flips this above the axis, so there is no necessity that the switch 44 be capable of actuation at both a maximum positive and negative alternating current. The switch 44 is designed so that the signal 3(c) from the second differentiator 43 passes only when the rectified signal 3(b)A from the absolute-value amplifier 42 is in the area of maximum signal. A threshold for this signal is set whereby the gate switch 44 passes the signal 3(c) only during the restricted time at which the signal 3(b)A is above this threshold. The resultant signal 51 passes into a zero-crossing detector 45; this signal 52 passes to the counter 36 to interact with the signal from the PLL, allowing the number of counts from the vernier between zeros to be counted for a distance measure which can be displayed on the display 38.

The device as illustrated has many advantages over prior-art devices. It is relatively inexpensive, requiring only ordinary collimating lenses, as compared with expensive tangent-corrected lenses needed in prior-art devices. The basic frequency of the system can be set by an ordinary transducer, and exact maintenance of frequency is not essential because of the use of the precision grating and the vernier in phase with the signal derived from it, hence high-cost devices need not be used. Temperature and humidity changes do not affect the accuracy of the measurements. Dust on the lens, or change in laser power which affects the intensity of the beam, has no effect on the measurement.

More important is the speed with which measurements can be made, both in time for making the measurement itself and in the rapidity in which measurements can be repeated. The mirror 15 can be oscillated very rapidly, permitting measurements to be made in a fraction of a millisecond, and the amplitude of the oscillation need not be great — only sufficient to scan the object — so that measurements can be repeated within 5 milliseconds or less, sufficiently rapidly to allow the figure shown on the display 38 to represent the average of several separate readings.

Moreover, the resolution and accuracy of the device are extremely high. The combination of a precise vernier in the form of a PLL and a precise measure of the edge of the test object ensures optimum high resolution and accuracy. Measurement precision of a few tenths of a mil (i.e., 0.0001 to 0.0003 inch) is readily obtainable.

The precise position of the test object in the test space is not important; the object need only be somewhere in the scanning zone of the beam. With other than cylindrical objects, the orientation of the object of the scanning beam is of course essential. However, with cylindrical objects, other than gross variations in orientation make very little difference, having only second-order effects on the measurements. Thus the device can be used for measuring extruding aluminum rod as it comes out of an extruder at high speed, despite wiggling of the extruding rod which both changes the position of the rod and its orientation.

The output signal from the counter, instead of actuating a display, can be used, in conjunction with appropriate servo-mechanisms, to make desired operations to control the size of the test object.

While a preferred embodiment of the invention has been disclosed, obviously modifications can be made therein, without departing from the scope of the invention as defined in the claims.

What is claimed is:

1. An electrooptical device for measuring the cross-sectional width of an opaque test object which comprises (1) a source of radiant energy which provides a narrow beam; (2) means for scanning this beam in a direction perpendicular to its direction of propagation; (3) means for collecting and splitting said scanned beam into first and second portions and (4A) to direct said first portion of said beam onto a first photodetector through a precision scale with alternate transparent and opqaue bands at least about half the width of the diameter of said scanned beam, to produce a sinusoidal signal whose spatial frequency corresponds to the spacings on said precision scale, and thence onto (5) means for breaking up said signal to produce a much higher frequency locked in phase to the output of said first photodetector, and (4B) to direct said second portion of said beam past said opaque test object onto a second photodetector which detects the modulation of said scanned beam by said test object; and (6) means connected to the signals derived from both portions of said beam for measuring the number of pulses while the energy is interrupted by the test object to produce a signal corresponding to the cross-sectional width of said test object.

2. The device of claim 1, in which the bands of the precision scale are between half the width of, to equal in width to, the diameter of said scanned beam and are equal in width to each other, whereby the signal produced has the form of a regular sine wave with a fixed spatial frequency.

3. The device of claim 2, in which (a) the output from the second photodetector is differentiated to produce signals of maximum intensity adjacent points corresponding to the edges of said test object; (b) a portion of said differentiated signal is further differentiated to produce signals of zero intensity at points corresponding to the edges of said test object; (c) a portion of the first differentiated signal is fed to a switch to which the second differentiated signal is also fed, which switch passes the second differentiated signal only for a limited period adjacent the peaks of said first differentiated signal; and (d) the signal from said switch is fed into a zero-crossing detector to produce a signal which is fed into means (5) of claim 1.

4. The device of claim 3, in which the source of radiant energy is a laser.

5. The device of claim 3, in which the bands of the precision scale are about half the width of the diameter of said scanned beam, and are equal in width to each other, whereby the signal produced has the form of a regular sine wave with a fixed spatial frequency.

* * * * *